United States Patent [19]
Edgar

[11] Patent Number: 5,469,275
[45] Date of Patent: Nov. 21, 1995

[54] METHOD AND APPARATUS FOR GRAYSCALE ADJUSTMENT

[75] Inventor: Albert D. Edgar, Austin, Tex.

[73] Assignee: International Business Machines Corporation, Armonk, N.Y.

[21] Appl. No.: 925,710

[22] Filed: Aug. 4, 1992

[51] Int. Cl.$^6$ .................................................... H04N 1/40
[52] U.S. Cl. ...................... 358/458; 358/406; 358/426
[58] Field of Search .................................. 358/406, 447, 358/335, 345, 244, 327, 76, 80, 81, 458, 443, 426, 214, 138, 300, 216; 364/551.01, 571.02, 525, 487, 481, 526; 382/56, 21, 22

[56] References Cited

U.S. PATENT DOCUMENTS

| | | | |
|---|---|---|---|
| 4,409,614 | 10/1983 | Eichler et al. | 358/76 |
| 4,760,447 | 7/1988 | Koka et al. | 358/139 |
| 4,794,540 | 12/1988 | Gutman et al. | 364/474.29 |
| 4,852,002 | 7/1989 | Klausz | 364/413.13 |
| 4,907,282 | 3/1990 | Daly et al. | 382/9 |
| 4,939,581 | 7/1990 | Shalit | 358/244 |
| 4,942,480 | 7/1990 | Shu | 358/455 |
| 4,961,117 | 10/1990 | Rumley | 358/461 |
| 4,965,679 | 10/1990 | Morton et al. | 358/462 |
| 4,984,097 | 1/1991 | Shu | 358/429 |
| 5,012,333 | 4/1991 | Lee et al. | 358/80 |
| 5,023,815 | 6/1991 | Wilson et al. | 358/214 |
| 5,028,855 | 7/1991 | Distler et al. | 318/568.13 |
| 5,038,158 | 8/1991 | Ayers et al. | 358/300 |
| 5,245,679 | 9/1993 | Rosenberg | 358/426 |
| 5,262,958 | 11/1993 | Chui et al. | 364/487 |
| 5,353,239 | 10/1994 | Kashiwagi | 364/551.01 |
| 5,369,499 | 11/1994 | Yip | 358/406 |

FOREIGN PATENT DOCUMENTS

| | | |
|---|---|---|
| 430165A3 | 5/1991 | European Pat. Off. . |
| 5-061972 | 7/1993 | Japan . |
| WO91/16785 | 10/1991 | WIPO . |

OTHER PUBLICATIONS

Aldus Photostyler Version 1.1, "User Manual", Second Edition, Jun. 1992, Aldus Corporation, pp. ii–402.
Aldus Photostyler Version 1.1, "Getting Started", Second Edition, Jun. 1992, Aldus Corporation, pp. ii–76.
Picture Publisher for Windows 3.0, "Reference Guide", 1992, Micrografx Corp., pp. iii–index D–9.
Picture Publisher for Windows 3.0, "Learning Guide", 1992, Micrografx Corp., pp. iii–index B–3.
Picture Publisher for Windows 3.0, "Filters Guide", 1992, Micrografx Corp., pp. iii–22.
Picture Publisher for Windows 3.0, "Supplement", 1992, Micrografx Corp., pp. iii–index A–3.
"Adobe Photoshop 2.0", Copyright 1992, International Computer Program, Inc., Abstract.

*Primary Examiner*—Paul Ip
*Attorney, Agent, or Firm*—Paul S. Drake

[57] ABSTRACT

A method for adjusting a grayscale spline, defined by a set of interconnected points, for an output device including the steps of adjusting a location of a first point previously located on the grayscale spline, adjusting a location of at least one other point, previously located on the grayscale spline, based on the adjusted location of the first point, generating a grayscale spline through the first point and the at least one other point, and producing an image with the output device using the generated grayscale spline. In addition, an apparatus for adjusting a grayscale spline, defined by a set of interconnected points, for an output device including an apparatus for adjusting a location of a first point on the grayscale spline, an apparatus for automatically adjusting a location of at least one other point, previously located on the grayscale spline, based on the adjusted location of the first point, and an apparatus for generating a grayscale spline through the first point and the at least one other point.

42 Claims, 9 Drawing Sheets

PRIOR ART

METHOD AND APPARATUS FOR GRAYSCALE ADJUSTMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This patent application is related to patent application Ser. No. 07/925,340 filed Aug. 4, 1992, and issue date Jun. 7, 1994, U.S. Pat. No. 5,319,742 (IBM internal Docket No. AT9-92-090), entitled "PALETTIZED FUZZY MASK", hereby incorporated by reference, and to patent application Ser. No. 08/403,111, filed Mar. 13, 1995 which is a continuation of Ser. No. 07/925,712 filed Aug. 4, 1992 (IBM internal Docket No. AT9-92-091), entitled "METHOD AND APPARATUS FOR LINEAR COLOR PROCESSING", hereby incorporated by reference.

TECHNICAL FIELD

The present invention relates to image processing and more particularly to selectively adjusting the grayscale.

BACKGROUND ART

Many methods for displaying color information on display devices are known in the art. Most computer systems utilize RGB (red green blue) techniques wherein color information is processed as three separate digital units of color information for each displayed pixel. For example, in a typical 24 bit RGB computer system, 8 bits describe the intensity or brightness of a red color gun of a display, 8 bits describe the intensity of a green color gun of the display, and 8 bits describe the intensity of a blue color gun of the display for a total of over 16 million possible colors for each displayed pixel.

In image processing, frequently an image will be too dark, too red, too green or have some other defect which will require an image processing operation to be uniformly applied over the entire image. For example, a user such as an artist might want to increase the red of a portrait to enhance a skin tone. The user may be able to accomplish this using a technique grayscale adjustment.

Figure 1A:
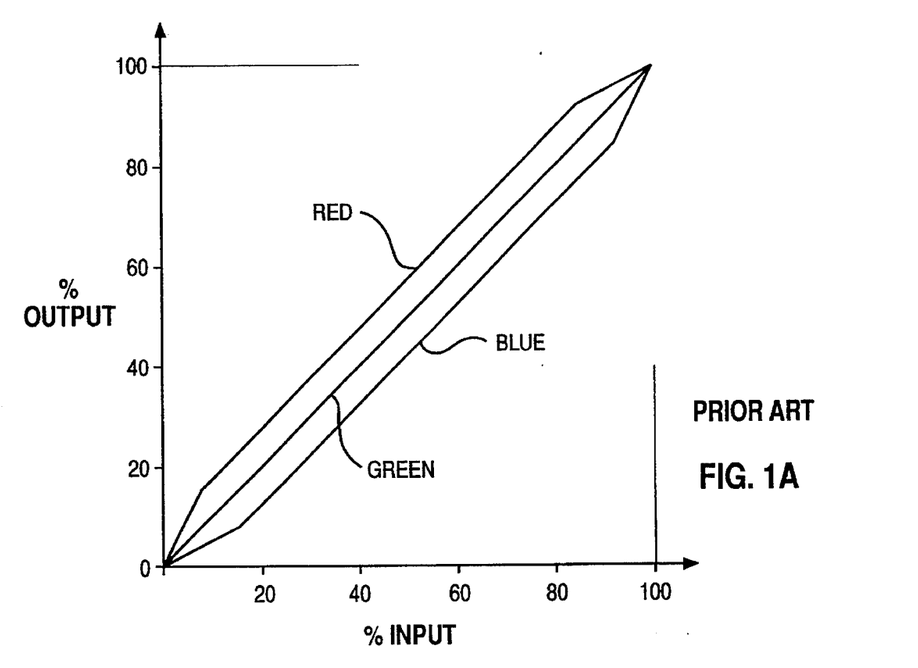
FIGS. 1A–1C illustrate a grayscale with the brightness and the contrast adjusted.
Figure 1B:
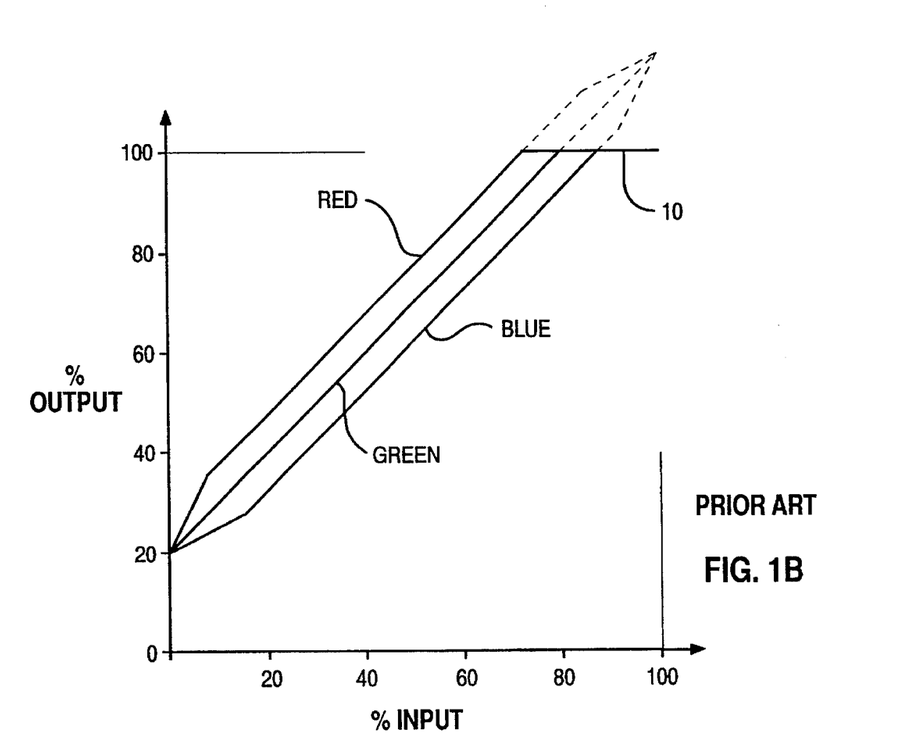
Figure 1C:
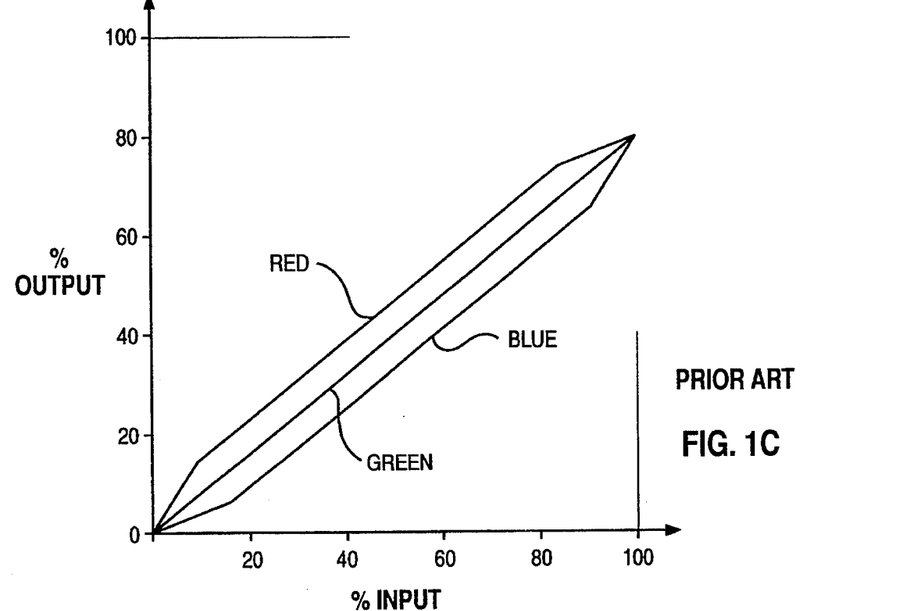

Grayscale adjustment is a technique wherein the intensity or brightness of each of the three color components of pixels may be adjusted to modify the brightness, color and/or contrast of an image (including a graphics image, a still photograph, video or the like). One of the simplest and best known techniques is shown in FIGS. 1A–1C. A display may have an input to output relationship for each color, hereinafter referred to as a grayscale, as shown in FIG. 1A. Of course, other images, displays or other types of devices such as printers or plotters may have other possible grayscales. A simple brightness control may increase the overall brightness of all colors simultaneously as shown in FIG. 1B. Note, however, that greater than 100 percent or white output is often not possible and increasing the brightness of the overall image results in brightness saturation for a larger number of input values. This saturation is shown in the flat line 10 at the 100 percent or white output value in FIG. 1B. However, if greater than 100 percent or white output is possible for a given device, then the result would be the dashed lines shown in FIG. 1B. Many systems also allow for the brightness control of each color to be modified separately. The contrast of the image may also be modified as shown in FIG. 1C. The contrast control modifies the slope of the grayscale relationship to achieve the desirable contrast.

Figure 2:
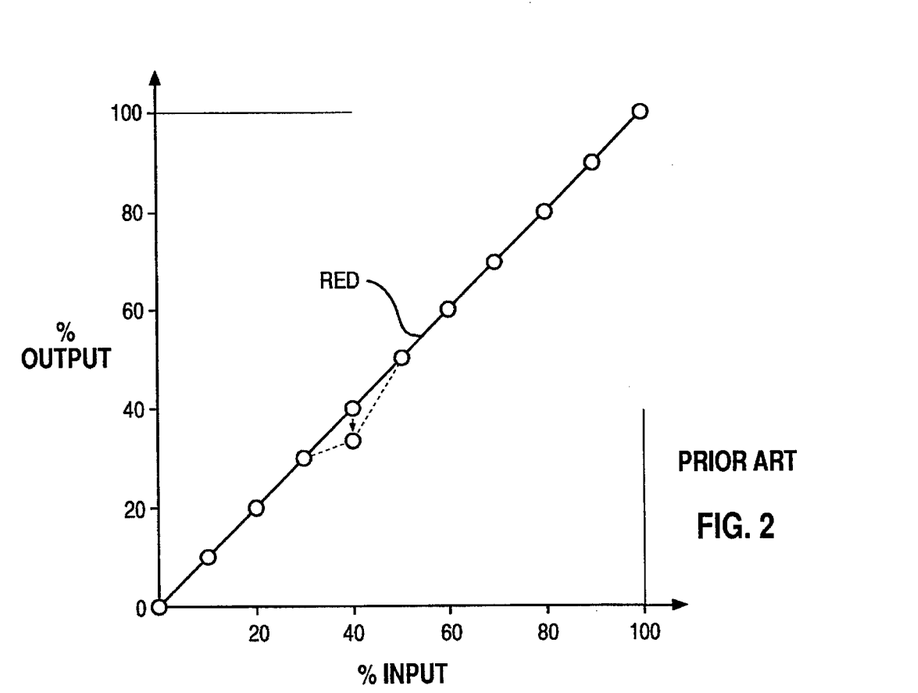
FIGS. 2 and 3 illustrate grayscale splines modified using prior art techniques.

Several software tools exist for selectively adjusting the grayscale by selectively adjusting points on a grayscale spline. A spline is a set of points that are interconnected by some form of interpolation such as straight line, Bezier or parametric techniques. For example, Picture Publisher provides 11 points that can be adjusted for each color with straight lines linking the 11 points. FIG. 2 illustrates a grayscale spline for the color red with the 11 points that can be adjusted. The user may move any one of the 11 points for this color and the system will then draw straight lines linking the moved point with the adjacent nonmoving points. This is shown in FIG. 2 as dashed lines as the 40 percent input point is set to 35 percent output. The user may also move any of the other 10 points individually to provide the desired grayscale spline. The same process may also be performed for the color blue and the color green. As a result of the modifications to the grayscale spline, an image rendered using the grayscale spline will reflect the changes selected by the user.

Figure 3:
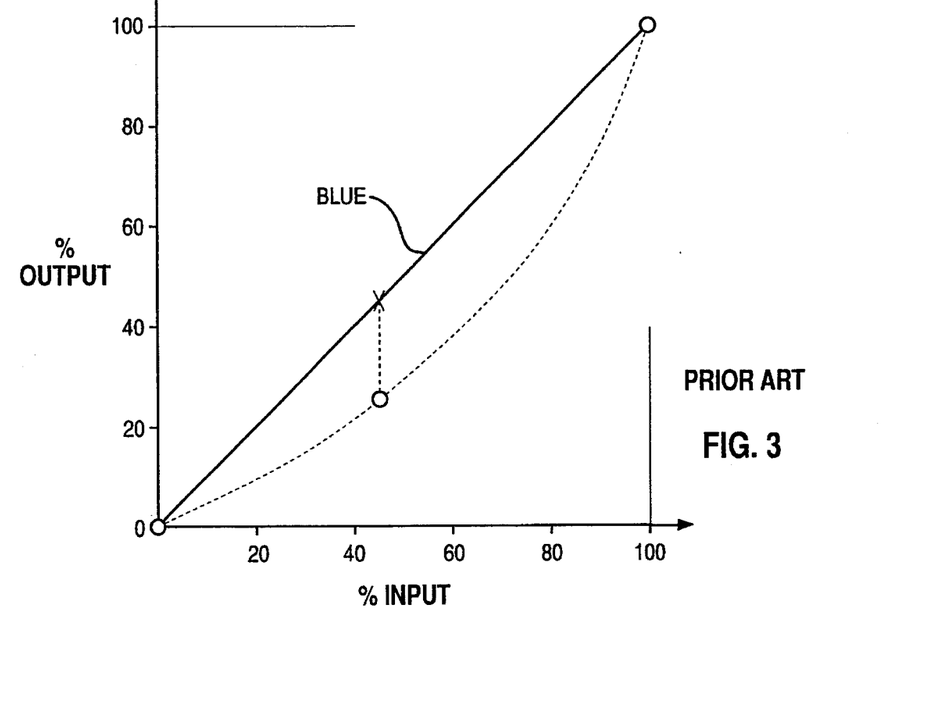

Another example is Photoshop which initially provides a straight line grayscale spline for each color. As shown in FIG. 3, the user may select a point on the blue spline, from the 42 percent input level in the illustrated case, and move it, to the 23 percent level output level in this case. The system then redraws the blue grayscale spline using a Bezier curve, shown as a dashed line in FIG. 3. The user may select and move another point on the blue grayscale spline which is then redrawn again as a Bezier curve through each of the selected points. This process continues one point at a time until the desired grayscale spline for the blue color is achieved. The same process may also be performed for the color red and the color green.

One problem with the above prior art techniques is that the user needs to have a detailed understanding of the relationships between color intensities and colors and the impact of changes of a grayscale spline on a final image. Otherwise, the user will probably have to perform a large amount of experimentation in order to obtain the desired effects on an image.

DISCLOSURE OF THE INVENTION

The present invention includes a method for adjusting a grayscale spline, defined by a set of interconnected points, for an output device including the steps of adjusting a location of a first point previously located on the grayscale spline, adjusting a location of at least one other point, previously located on the grayscale spline, based on the adjusted location of the first point, generating a grayscale spline through the first point and the at least one other point, and producing an image with the output device using the generated grayscale spline. In addition, the present invention includes an apparatus for adjusting a grayscale spline, defined by a set of interconnected points, for an output device including an apparatus for adjusting a location of a first point previously located on the grayscale spline, an apparatus for adjusting a location of at least one other point, previously located on the grayscale spline, based on the adjusted location of the first point, and an apparatus for generating a grayscale spline through the first point and the at least one other point.

A further understanding of the nature and advantages of the present invention may be realized by reference to the remaining portions of the specification and the drawings.

BEST MODE FOR CARRYING OUT THE INVENTION

Figure 4:
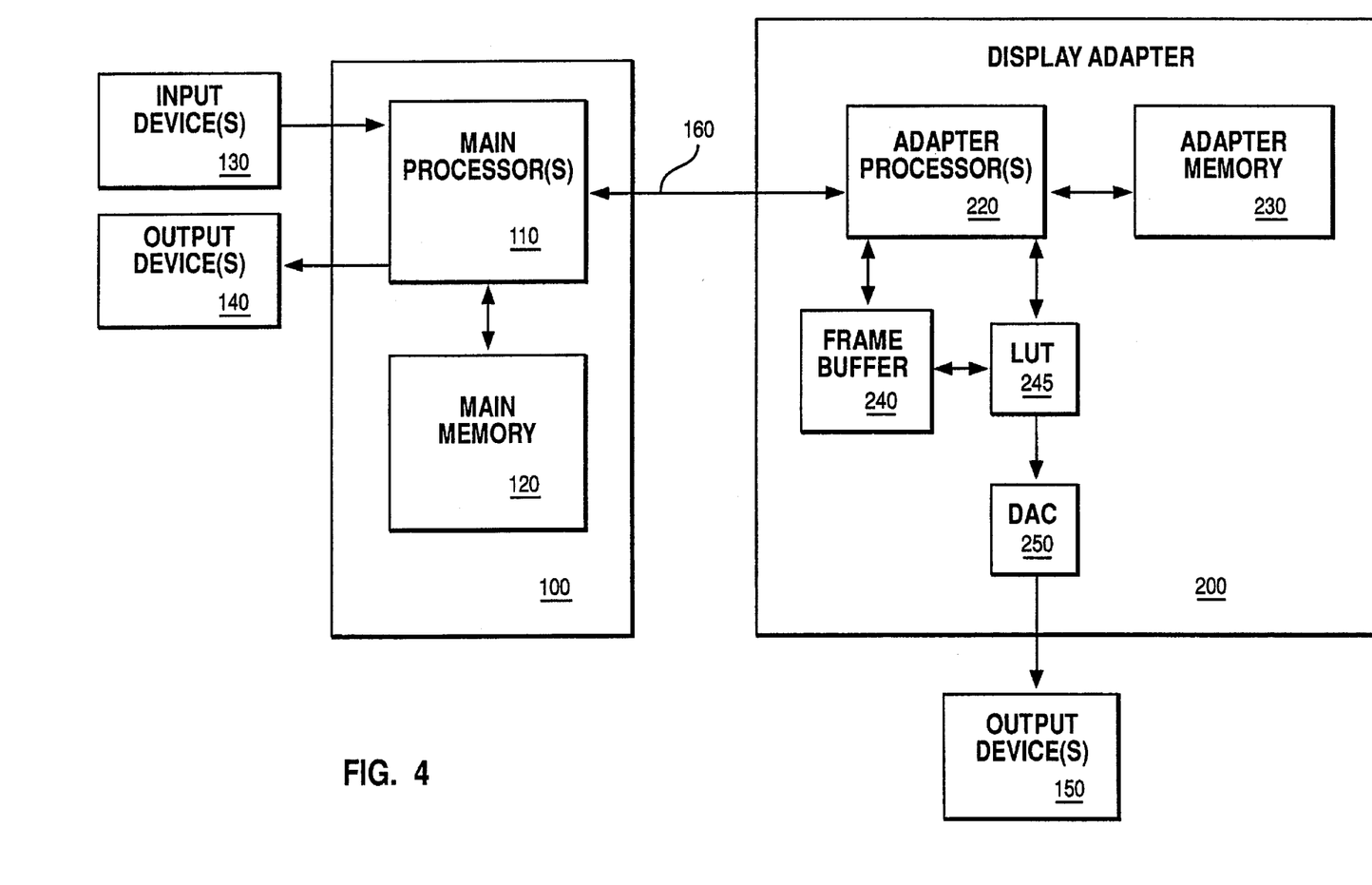
FIG. 4 is a block diagram of a typical digital computer utilized by a preferred embodiment of the invention.

FIG. 4 is a block diagram of a typical digital computer 100 utilized by a preferred embodiment of the invention. The computer, preferably one in the IBM multimedia PS/2 series of computers, includes main processor(s) 110 coupled to a main memory 120, input device(s) 130 and output device(s) 140. Main processor(s) 110 may include a single processor or multiple processors. Main processor is preferably one of the Intel family of 8088, 286, 386 or 486 microprocessors. However, other microprocessors may be utilized such as the Motorola family of 68000, 68020 or 68030 microprocessors, or one of the various Reduced Instruction Set Computer (RISC) microprocessors manufactured by IBM, Hewlett Packard, Sun, Motorola and others. Input device(s) 130 may include a keyboard, mouse, tablet or other types of input devices. Output device(s) 140 may include a text monitor, plotter, printer or other types of output devices. The main processor may also be coupled to display output device(s) 150 such as a graphics display through a display adapter 200. Display adapter 200 receives instructions regarding graphics or display information from main processor 110 on bus 160. The display adapter then executes those instructions with display adapter processor(s) 220 coupled to a display adapter memory 230. Some display adapters may not include a processor. The display processors in the display adapter then execute those instructions and updates frame buffer(s) 240 and video look up table (LUT) 245 based on those instructions. Display processor(s) 220 may also include specialized rendering hardware for rendering specific types of primitives to be rendered. Frame buffer(s) 240 includes an index value for every pixel to be displayed on the display output device. The index value read from the frame buffer is used to read LUT 245 for the actual color to be displayed. A DAC (digital-to-analog converter) 250 converts the digital data stored in the LUT into RGB signals to be provided to the display 150, thereby rendering the desired image output from the main processor.

In the preferred embodiment, the grayscale spline adjustment technique could be utilized in the computer application software which is executed by the main processor. As would be obvious to one of ordinary skill in the art, the present technique could be applied in many other locations within the host computer or display adapter. For illustrative purposes, the present invention is described below utilizing a 24 bit RGB color system (8 bits each for red, green, and blue color component) with an 8 bit frame buffer, a 256 color video Look Up Table (LUT), and a 640×480 display.

Figure 5:
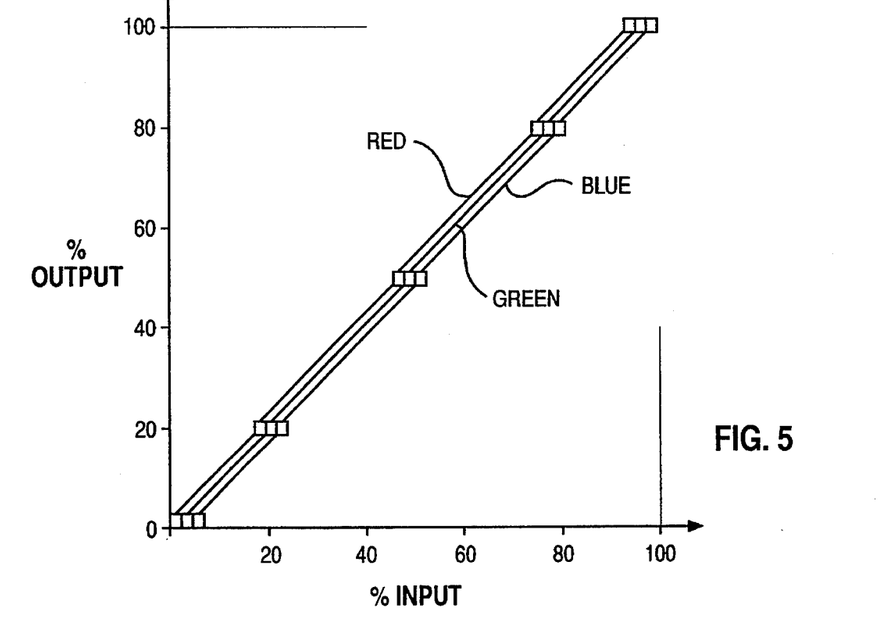
FIG. 5 illustrates a grayscale spline that may be modified according to the present invention.

FIG. 5 illustrates a grayscale spline that may be modified according to the present invention. Initially, in the preferred embodiment, the grayscale spline for each of the colors is a straight line. Shown are five points for each color that may be adjusted according to the present invention. In the preferred embodiment these five points for red are R0 for a 0% or black shade of red, R1 for a 20% or dark gray shade of red, R2 for a 50% or middle gray shade of red, R3 for an 80% or light gray shade of red and R4 for a 100% or white shade of red. The five points for blue and green are at the same locations in the preferred embodiment. Each of these points are connected by a spline which will be described in greater detail below. In the preferred embodiment, each of the colors may be individually modified or all the colors may be modified simultaneously. For illustrative purposes, modification of the color red grayscale spline will be shown in FIGS. 6A–6F.

Figure 6A:
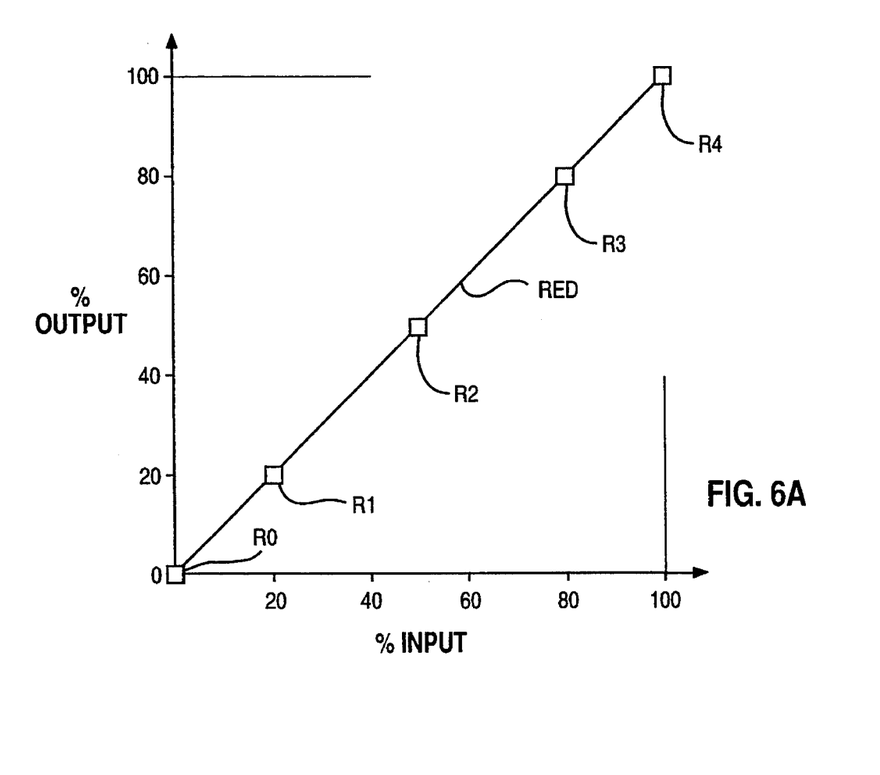
FIGS. 6A–6F illustrate adjusting the grayscale spline for the color red according to the present invention.
Figure 6B:
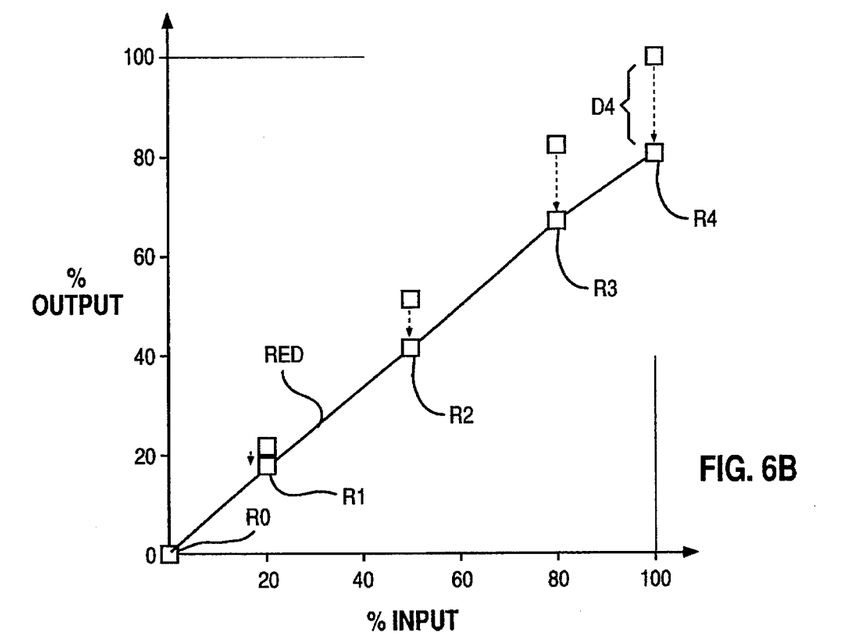

FIG. 6A illustrates the grayscale spline for the color red prior to modification. FIG. 6B illustrates modifying the white level or R4 by moving it downwards to affect overall brightness of the image without affecting the black point R0. Accordingly, in the preferred embodiment, any change in R4 will need to affect the other variables except for R0. As shown in FIG. 6B, as the R4 value is decreased by amount D4, all of the remaining points also are automatically decreased except for the black or R0 level. The white level adjustment thus becomes comparable to a brightness adjustment, one of the most basic and simple of all controls. Table 1 illustrates code that can be used to modify the R4 level.

TABLE 1

| /* | (c) Copyright International Business | */ |
| /* | Machines Corp. 1992 All Rights Reserved | */ |
| /* | This code lowers R4 (white shade of red) | */ |
| /* | by a relative amount called d4. d4 is a | */ |
| /* | measure of distance on a 0 to infinity scale | */ |
| /* | that is proportional to D4 shown on | */ |
| /* | FIG. 6B where d4 = 1−1/(1+D4). | */ |
| /* | (Note: To raise R4, change all / to * ) | */ |
| /* | R3, R2 and R1 also change, R0 is unaltered. | */ |
| R4=(R4−R0)/(1.+d4)+R0; | | |
| R3=(R3−R0)/(1.+d4)+R0; | | |
| R2=(R2−R0)/(1.+d4)+R0; | | |
| R1=(R1−R0)/(1.+d4)+R0; | | |

Figure 6C:
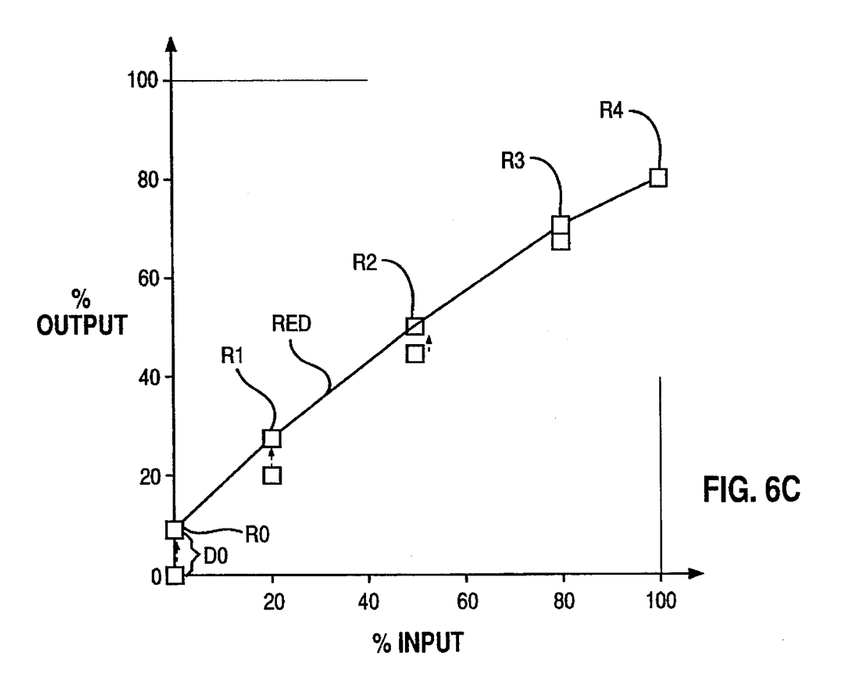

FIG. 6C illustrates modifying the black level or R0 following the same approach. Moving R0 or black level by amount D0 also causes R1, R2 and R3 to move as well without causing R4 to move. Table 2 illustrates code that can be used to modify R0 and the related points R1–R3.

TABLE 2

| /* | (c) Copyright International Business | */ |
| /* | Machines Corp. 1992 All Rights Reserved | */ |
| /* | This code raises R0 (black shade or red) | */ |
| /* | by a relative amount d0 = 1−1/(1+D0) | */ |
| /* | (Note: To lower R0, change all * to / ) | */ |
| /* | R1, R2 and R3 also change, R4 is unaltered. | */ |
| R0=(R0−R4)*(1.+d0)+R4; | | |
| R1=(R1−R4)*(1.+d0)+R4; | | |

TABLE 2-continued

Figure 6D:
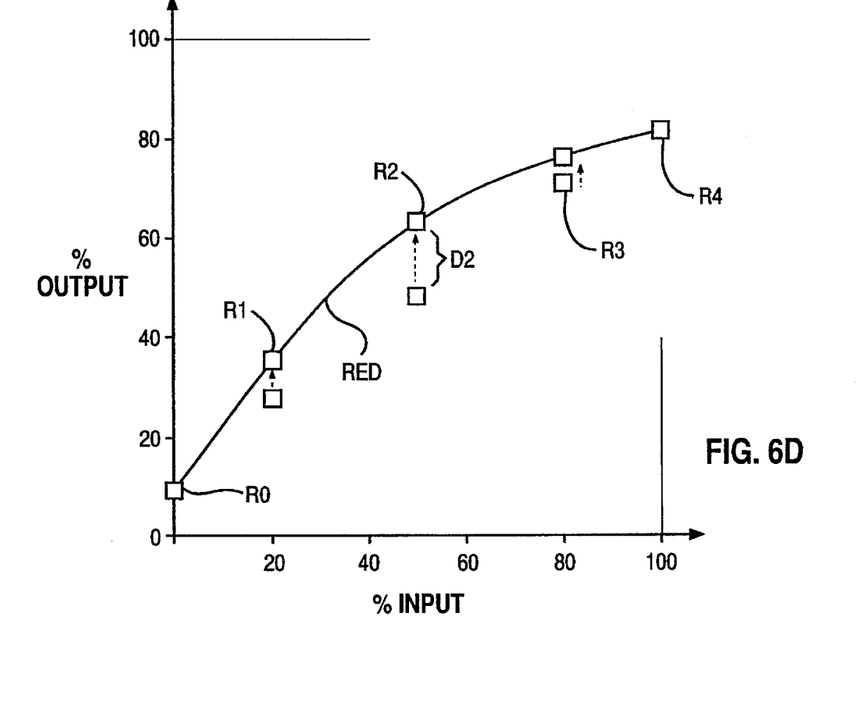

R2=(R2−R4)*(1.+d0)+R4;
R3=(R3−R4)*(1.+d0)+R4;

The gray or R2 level may also be adjusted in combination with R1 and R3. This is used as a kind of contrast control called gamma. It can make the picture dark and moody or light and airy and can change the color of an image without harshly affecting highlights or shadows. Having adjusted the white level and black level according to saturation limits, it is usually preferable to leave them alone. Adjusting R2 will never saturate or unsaturate any white or black. As shown in FIG. 6D, when the gray level R2 is moved by amount D2, then the R1 and R3 values are also modified accordingly in the preferred embodiment. Table 3 illustrates code that can be used to modify R2 and the related points R1 and R3.

The formulas used in the code in Table 3 aim the middle gray, do not affect the white R4 or black R0, and vary light R3 and dark gray R1 proportionately. Middle gray of a straight line is affected as much per incremental change as white was per incremental change in the example of Table 1. R2 is raised by D2*100 percent of R4−R0 when R2 is midway between R0 and However the effect is proportional so gray can not surpass white R4 or black R0.

First, find t1=(R2−R0)/(R4−R2). t1 points to the position of gray R2 relative to black R0 and white but cast in a function that varies between 0 and infinity so it can be multiplied or divided by any positive number without it going out of it's 0 to infinity range. Thus, t1 is multiplied by (1+4d2) to step it by the d2 step size. Next, calculate t2=(t1*R4+R0)/(t1+1.). This formula undoes what the first formula did, so nominally t2 would equal to R2 as presented so far. In the last line of Table 3, R3 gets set to t2. It is maintained separate before then so the old and new value can enter into other calculations. However, in the program t1 is also multiplied by (1.+4*d2) so t2 gets increased. The "4*" gives the same percentage increase as previously presented for R0 and R4 if R2 is exactly midway between R0 and R4. But if the grayscale line is skewed, these formulas reduce the amount of change so it is proportioned to keep t2 within the desired range. The division, rather than an addition in the matching reduction statement makes this process reversible with the same number of strokes in the other direction.

The logic begins similarly to calculate R1 by translating it into the zero to infinity range. The translation into the skewed range uses R2, while the translation out uses the revised t2, so the first order correction is automatic. Beyond that it describes a bounded parabola The 20% point needs to move 0.64 of the 50% point. 0.40 will be automatic by the second order nature of a parabola, so 0.24 more is needed. Thus the 1+d2 term becomes pow(t3,0.24*4.) where t3 is the relative movement of the R2 point.

TABLE 3

Figure 6E:
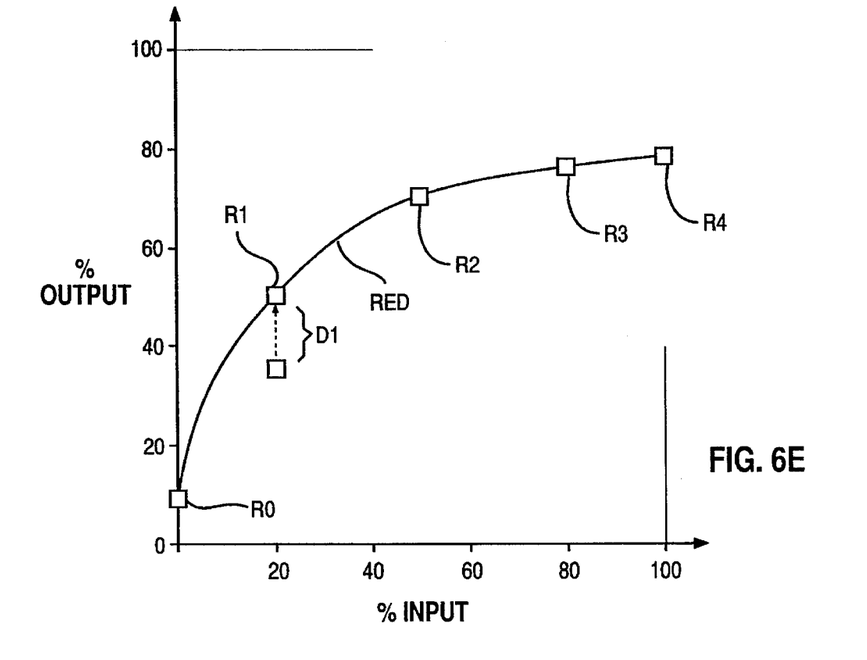
Figure 6F:
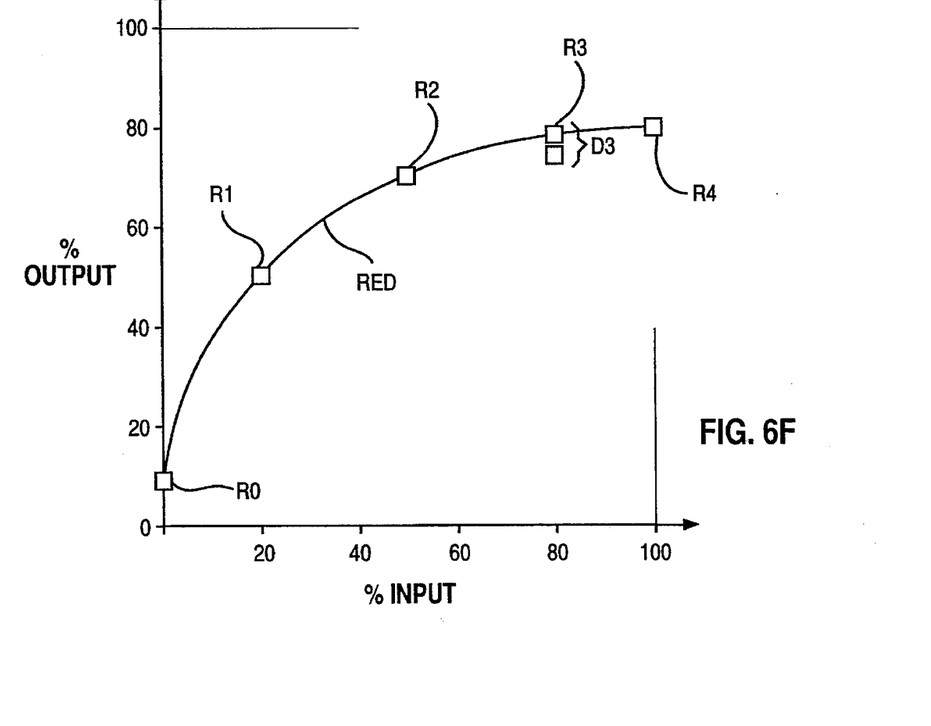

| /* | (c) Copyright International Business | */ |
| /* | Machines Corp. 1992 All Rights Reserved | */ |
| /* | This code raises R2 (middle gray) by a | */ |
| /* | relative amount d2 ~= 1−1/(1+d2) | */ |
| /* | (Note: To lower R2 by a relative delta, | */ |
| /* | change *(1.+4.*d2) to /(1.+4.*d2) ) | */ |
| /* | R1 and R3 also change, R0 and R4 are | */ |
| /* | unaltered. t_ are temporary values. | */ | t1=(R2−R0)/(R4−R2)*(1.+4.*d2);
t2=(t1*R4+R0)/(t1+1.);

TABLE 3-continued t3=(t2−R0)/(R2−R0);
t4=(t2−R4)/(R2−R4);
t5=(R1−R0)/(R2−R1)*pow(t3,.24*4.);
R1=(t5*t2+R0)/(t5+1.);
t5=(R3−R4)/(R2−R3)*pow(t4,.24*4.);
R3=(t5*t2+R4)/(t5+1.);
R2=t2;

FIG. 6E and F illustrate modifying the controls for the dark gray and light gray independently. The darkened gray control. R1 controls the contrast of the shadows to pick out detail from images that were underexposed or control shadow color independent of the rest of the image. Table 4 illustrates code that can be used to modify R1. As before, t1 takes R1 into a domain that varies from zero to infinity between R0 and R2, such that multiplying or dividing by any finite positive number will not take it beyond the limits set by R0 and R2.

TABLE 4

| /* | (c) Copyright International Business | */ |
| /* | Machines Corp. 1992 All Rights Reserved | */ |
| /* | This code raises R1 (dark gray) by amount d1. | */ |
| /* | (To lower R3, change *(1.+4.*d1) to /(1.+4.*d1)) | */ |
| /* | The code operates in nonlinear space so R1 can | */ |
| /* | never be greater than R2 or less than R0. | */ |
| /* | R0, R2, R3, and R4 are unaltered. | */ | t1=(R1−R0)/(R2−R1)*(1.+4.*d1);
R1=(t1*R2+R0)/(t1+1.);

The light gray control R3 alters the contrast of extreme highlights to pick out detail in overexposed slides or tint splashes of sunlight. Table 5 illustrates code that can be used to modify R3.

TABLE 5

| /* | (c) Copyright International Business | */ |
| /* | Machines Corp. 1992 All Rights Reserved | */ |
| /* | This code raises R3 (light gray) by a amount d3. | */ |
| /* | (To lower R3, change *(1.+4.*d3) to /(1.+4.*d3)) | */ |
| /* | The code operates in nonlinear space so R3 can | */ |
| /* | never be greater than R4 or less than R2. | */ |
| /* | R0, R1, R2, and R4 are unaltered. | */ | t1=(R3−R2)/(R4−R3)*(1.+4.*d3);
R3=(t1*R4+R2)/(t1+1.);

As mentioned before, these sections of code expressed for red, would normally be repeated for green and blue, resulting also in the variables G0, G1, G2, G3, G4, B0, B1, B2, B3, and B4.

As the various points on the grayscale are moved, a spline needs to be run through the 5 points corresponding to each of the 3 colors to provide a continuous grayscale curve for each color for use in splining the image for all grayscale points in an image. A spline is an interpolation technique that typically forms a continuous line through a given set of points. However, a spline may also comprise a large number of discrete points that appear to form a line through a given set of points. Many spline functions exist to run a smooth curve through 5 points such as using a 4th order polynomial or using a Bezier curve. However, it is preferred that the spline be monotonic positive (upward sloping at all points) so no part of the grayscale goes into a negative slope. A simple 4th order polynomial fails this such that under even moderate adjustment of the gamma variable R2 giving solarized highlights or shadows. The eye is also very sensitive to the first derivative of the curve. This first derivative determines the graininess and detail of any level of grayscale and therefore the first derivative must be a smoothly varying continuous variable. Finally, the extreme points must maintain reasonable contrast, thus certain end point assumptions commonly made by spline algorithms do not work well. The contiguous code shown in Tables 6A and 6B below solves these problems by operating in the first derivative, or slope, domain. That is, the slope of the spline is always monotonic. This is accomplished by careful selection of slopes at each point on the spline and possibly at some intermediate points. These points are then splined with polynomial curves. Such a function is extremely important to extend a manageable set of variable points along a grayscale spline to a smoothly continuous grayscale spline for image translation.

TABLE 6A

```
/*         (c) Copyright International Business          */
/*         Machines Corp. 1992 All Rights Reserved       */
/*         Receive the gray scale aim points, return     */
/*         translation array.                            */
    translate(ncolinc,R0,R1,R2,R3,R4,transr)
      float R0,R1,R2,R3,R4,transr[256];
      int ncolinc;
      { float x,xx,yy,tr;
        float xxa[11],yya[11],sa[21],xa[21],ya[21],qa[21];
        int n,na,ix,iy;
/*         copy in xxa[ ] and yya[ ]. Note xxa and yya are */
/*         the only arrays that count in double steps.    */
        xxa[0]=.0;    xxa[1]=.2;     xxa[2]=.5;    xxa[3]=.8;
        xxa[4]=1.;    na=5;          yya[0]=R0;    yya[1]=R1;
        yya[2]=R2;    yya[3]=R3;     yya[4]=R4;
/*         Calculate slopes at input nodes as the reciprocal */
/*         of the average of reciprocals of the slopes to   */
/*         the lower and higher nodes. This limits the      */
/*         slope to less than twice the segment slope so the */
/*         intermediate node slope need never be negative.   */
        for(n=1; n<=na-2; n++)
          sa[n*2]=
            2./(1./((yya[n]-yya[n-1])/(xxa[n]-xxa[n-1]))
            +1./((yya[n+1]-yya[n])/(xxa[n+1]-xxa[n])));
/*         Calculate slopes at end nodes as 2*segment slope */
/*         minus internal node slope. Because of limits on  */
/*         the previous calculation of the internal node    */
/*         slope, this can never be zero.                   */
        sa[0]=2.*(yya[1]-yya[0])/(xxa[1]-xxa[0])-sa[2];
        sa[na*2-2]=2.*(yya[na-1]-yya[na-2])/
                (xxa[na-1]-xxa[na-2])-sa[2*na-4];
/*                                                         */
/*         continued in Table 6B                           */
```

TABLE 6B

```
/*         Calculate slopes at intermediate nodes. Half    */
/*         the intermediate slope plus a quarter of each   */
/*         end slope must equal the total segment slope.   */
        for(n=1; n<=2*na-3; n+=2)
          sa[n]= 2.*((yya[n/2+1]-yya[n/2])/
                (xxa[n/2+1]-xxa[n/2])-(sa[n-1]+sa[n+1])/4);
/*         Copy input nodes from xxa[ ] & yya[ ] into xa[ ] */
/*         and ya[ ] and compute the intermediate nodes    */
        for(n=0; n<=na-1; n++)
          {xa[n*2]=xxa[n]; ya[n*2]=yya[n];}
        for(n=1; n<=2*na-3; n+=2)
          {xa[n]=(xa[n-1]+xa[n+1])/2.;
          ya[n]=ya[n-1]+(xa[n]-xa[n-1])*(sa[n-1]+sa[n])/2.;}
/*         Compute the coefficients for y=qa[n]x^2+*/
/*         sa[n]x+ya[n] where x=aim gray level-xa[n] and n */
/*         is such that xa[n] (or ya[n]) is the largest it */
/*         can be without x being negative.               */
        for(n=0; n<=na*2-3; n++)
          qa[n]=(sa[n+1]-sa[n])/2./(xa[n+1]-xa[n]);
        qa[na*2-2]=0.;
/*         Generate the translation table.                */
/*         ya[n]+sa[n]*x+qa[n]*x*x=yy -or- {ya[n]-yy} +   */
/*         {sa[n]}*x + {qa[n]}*x*x = 0 where xx=x+xa[n] and */
/*         xx and yy are absolute x and y coordinates    */
```

TABLE 6B-continued

```
        n=0;
        for (iy=0; iy<=255; iy+=ncolinc) {yy=(float)iy/255.;
          if(yy<=ya[0]) tr=xa[0];
            else if (yy>=ya[2*na-2]) tr=xa[2*na-2];
            else {if(ya[n+1]<=yy) n++;
              if(fabs(qa[n])<.001) tr=(yy-ya[n])/sa[n]+xa[n];
                else tr=(-sa[n]+sqrt((double))sa[n]*sa[n]-4.
                    *qa[n]*(ya[n]-yy))) )/(2.*qa[n])+xa[n];
            }    transr[iy]=tr;     }    }
```

The techniques for generating the grayscale spline according to the present invention involve having relationships between the points on the grayscale curve. That is, when one point is moved, other points are also moved at the same time. By providing these relationships, a more user friendly system is made available that allows a user to achieve the desired results more readily. In addition, the flexibility of the grayscale spline is maintained for detailed modification. In the preferred embodiment with 5 defined points on the curve that can be moved, the points have a hierarchical relationship wherein R0 and R4 are at the top of the hierarchy, R2 is at the middle, and R1 and R3 are at the bottom of the hierarchy. In the hierarchy, moving R0 or R4 will cause R1, R2 and R3 to move at the same time. In addition, moving R2 will cause R1 and R3 to move. In alternative embodiments, as one of ordinary skill may appreciate, more or fewer points may be used (or may be user defined). In addition, the user may be able to define the hierarchy or other type of relationship between the points by use of a table or other relationship defining mechanism.

As one of ordinary skill can readily appreciate, the present invention may also be utilized to adjust the grayscale spline for a printer, plotter or other type of output device.

Figure 7:
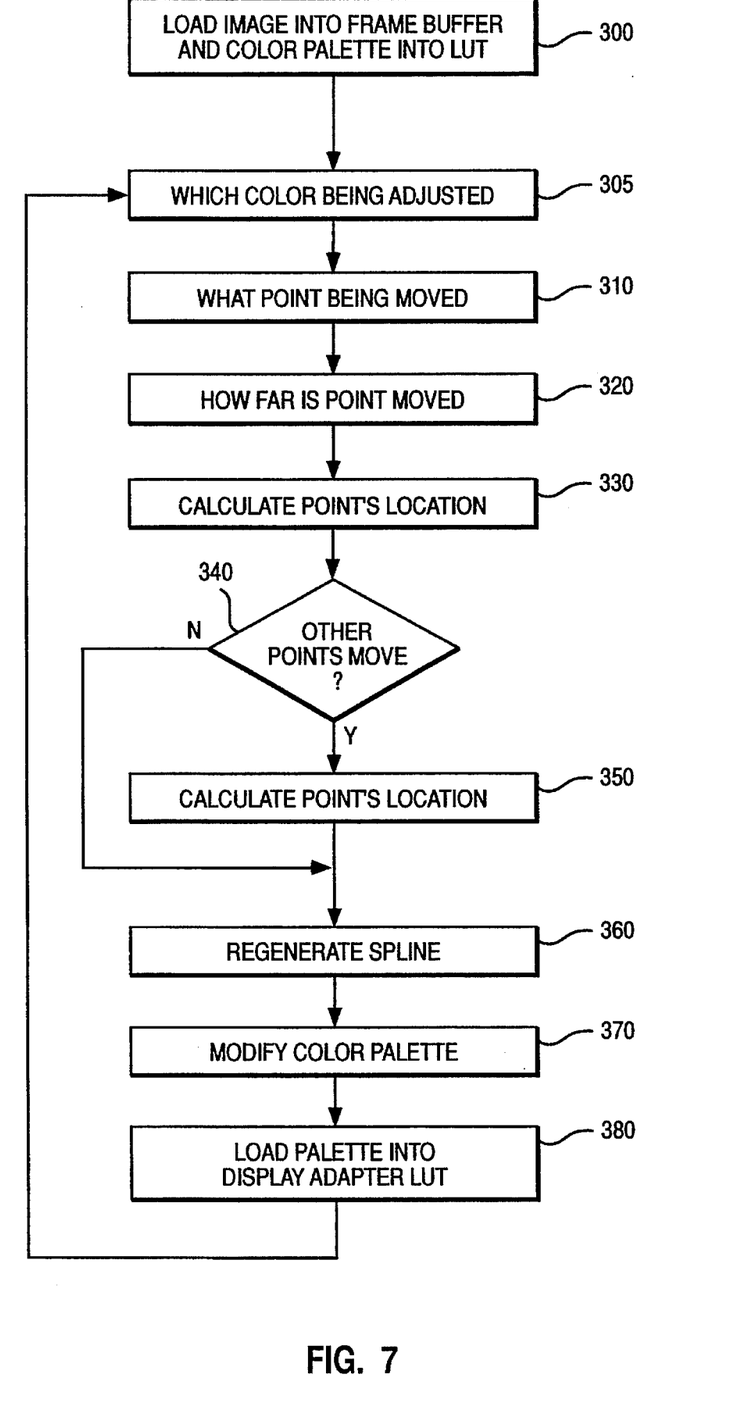
FIG. 7 is a flowchart illustrating a method for generating a grayscale spline for a given image according to the present invention.

FIG. 7 is a flowchart illustrating a preferred method for generating a grayscale for a given image. Before the color enhancement process is exercised, the user loads an image to be processed into a display adapter using a color palette, and loads the color palette associated with the image into the LUT in step 300. Now in exercising the process, in a first step 305, it is determined whether the user is selecting a particular color or all colors simultaneously. If all colors are selected, then corresponding points for each of the colors will be moved concurrently on the grayscale curve. In a second step 310, it is determined what point on the grayscale spline the user has selected. In a third step 320, it is determined the direction and magnitude of movement the user has requested. This is preferably determined on a proportional basis wherein the user indicates a percentage of movement toward a particular direction (e.g. 10 percent of the distance towards a limit for that point). This allows the user to move a particular direction in continually decreasing increments while specifying the same percentage, as the limit is approached. In a fourth step 330, the point's location on the grayscale is calculated from the user indications. In a fifth step 340, it is determined whether any other points also should be moved relative to the movement of the user selected point. This may be accomplished by hardcoding the relationship into the code performing this function or the user may define or predefine the point relationships in a table or the like. In a sixth step 350, the location of the other points location on the grayscale is calculated. In a seventh step 360, the spline is regenerated for the grayscale. In an eighth step 370, a color palette for storage in a LUT is generated by applying the three color grayscale splines to each palette color in the unprocessed palette associated with the image being displayed. This is performed using well known techniques including gamma distribution of the palette colors on the grayscale (a nonlinear distribution based on the human eye's perception of colors). In a ninth step, the color palette is loaded into the LUT of the display adapter so the new grayscale splines are applied to the image being displayed. In the preferred embodiment, this process is performed as quickly as feasible to provide quick feedback to the user. Ideally, the user should not be aware of any time lag between modifying the grayscale spline and the image being displayed being modified based on the grayscale spline modifications.

Figure 8:
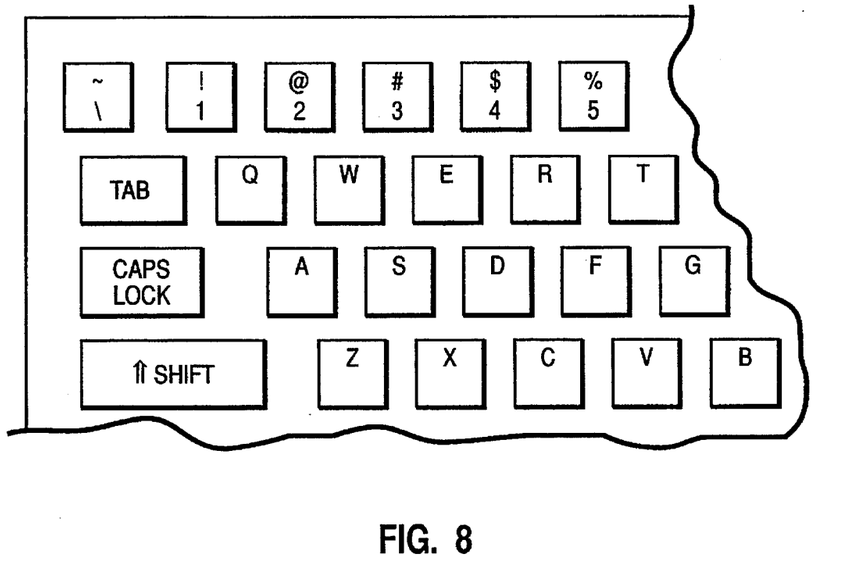
FIG. 8 illustrates the keys on a typical QWERTY keyboard that may be used to modify the location of points on a grayscale spline.

Several techniques may be used for the user to specify changes to points on each of the color grayscale splines. For example, the user may use the keys on a typical QWERTY keyboard as shown in FIG. 8. The 1, 2, 3, 4, and 5 keys may be used to specify increasing the first through fifth points, respectively, on the blue grayscale spline. The q, w, e, r, and t keys may be used to specify increasing the first through fifth points, respectively, on the green grayscale spline. The a, s, d, f, and g keys may be used to specify increasing the first through fifth points, respectively, on the red grayscale spline. The z, x, c, v, and b keys may be used to specify increasing the first through fifth points, respectively, for all the grayscale splines at the same time. By pressing shift and any one of the keys specified above, then that may specify that the particular point be decreased. In addition, each time a key is pressed, then the point indicated by that key is moved upwards or downwards (including any related points) in the grayscale. For example, if the d key is pressed, then the third point on the red grayscale spline is move upwards towards saturation by an increment and the second and fourth points on the red grayscale curve are also moved up slightly. If the d key is pressed again, then the third point on the red grayscale spline is moved upwards again and the second and fourth points also move upwards slightly again. If the shift key is pressed concurrently with the d key, then the third point on the red grayscale spline is moved downwards and the second and fourth points also move downwards slightly. This process may be performed while the image, video or the like having its grayscale spline adjusted is being displayed, providing for good concurrent feedback to the user.

Figure 9:
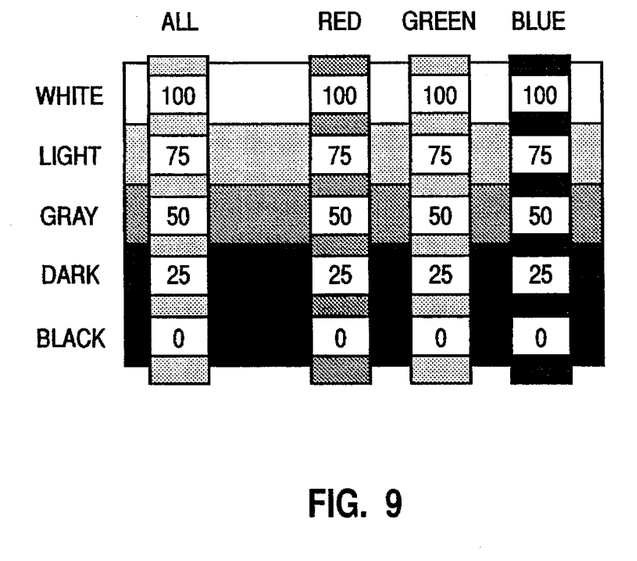
FIG. 9 provides a visual readout and input mechanism for each of the points on the grayscale spline.

Another technique that may be used for the user to specify changes to points on each of the color grayscale splines is shown in FIG. 9. This is a visual readout of each of the points on the grayscale that may be displayed over a portion of the image or may be displayed in a separate part of the display such as in a separate window. In this example, the user indicates which point is to be moved by clicking a mouse while a cursor is over the readout for that point. The user then moves the cursor upwards or downwards with the mouse to indicate the amount of movement of the point on the grayscale. As this is done, the image may be continually updated by the computer system to show the visual impact of the movement of the point. In addition, the readout of the point may also be continually updated to indicate the location of the point on the grayscale. Furthermore, other related points on the grayscale splines may also be moving upwards or downwards concurrently with the selected point.

In the preferred embodiment, the user may also request that the computer system display which points on the image being displayed are saturated or undersaturated. This may be activated or deactivated by pressing a certain key on the keyboard, by selecting a specified region in a window providing that option, or other commonly known techniques. The system will then display the image with all nonsaturated points in one color such as 50% gray, all oversaturated points in another color such as 100% white, and all undersaturated points in another color such as 0% black. When Combined with full color, this display may apply separately to each of the three colors. For example, a pixel with over saturated red, undersaturated blue, and unsaturated green would display as 100% red, 0% blue, and 50% green, producing a bright orange. This is accomplished in the process by receiving the grayscale spline calculated according to the invention presented above, leaving 0% and 100% points unaffected, and reducing all other points to 50%. Another useful feature, particularly in conjunction with the display of saturation is to receive the palette as calculated from the grayscale spline adjusted by this invention, but load into the LUT selectively either the full color, or load a select one of the three colors to all three color entires in the LUT. This effectively lets a user view separately each of the three color records of the image processed by this invention.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method for adjusting a grayscale spline, defined by a set of interconnected points, each of said points having a location adjustable by a user through a user interface, for an output device comprising the steps of:

a) adjusting, responsive to user input of a location adjustment through said user interface, a location of a first point previously located on said grayscale spline;

b) adjusting a location of at least one other point, previously located on said grayscale spline, based on the adjusted location of the first point;

c) generating a grayscale spline through said first point and said at least one other point; and d) producing an image with said output device using said generated grayscale spline.

2. The method of claim 1 wherein said step of generating includes generating a continuous grayscale spline.

3. The method of claim 2 wherein said step of generating includes generating a monotonic grayscale spline.

4. The method of claim 3 wherein said step of generating includes generating a monotonic grayscale spline in a first derivative domain.

5. The method of claim 1 wherein said step of adjusting said location of said at least one other point includes adjusting said location of said at least one other point based on a hierarchical relationship with said first point.

6. The method of claim 5 wherein said step of adjusting the location of the first point includes receiving signals from a keyboard indicating the adjustment of the location of said first point.

7. The method of claim 5 wherein said step of adjusting the location of the first point includes receiving signals from a display user interface indicating the adjustment of the location of said first point.

8. The method of claim 5 wherein said step of producing an image includes producing an image with a display.

9. The method of claim 5 wherein said step of producing an image includes producing an image with a printer.

10. The method of claim 5 wherein said step of producing an image includes producing an image with a plotter.

11. An apparatus for adjusting a grayscale spline, defined by a set of interconnected points, each of said points having a location adjustable by a user through a user interface, for an output device comprising:

a) means for adjusting, responsive to user input of a location adjustment through said user interface, a location of a first point previously located on said grayscale spline;

b) means for adjusting a location of at least one other point, previously located on said grayscale spline, based on the adjusted location of the first point; and c) means for generating a grayscale spline through said first point and said at least one other point.

12. The apparatus of claim 11 wherein said means for generating includes means for generating a continuous grayscale spline.

13. The apparatus of claim 12 wherein said means for generating includes means for generating a monotonic grayscale spline.

14. The apparatus of claim 13 wherein said means for generating includes means for generating a monotonic grayscale spline in a first derivative domain.

15. The apparatus of claim 11 wherein said means for adjusting said location of said at least one other point includes means for adjusting said location of said at least one other point based on a hierarchical relationship with said first point.

16. The apparatus of claim 15 wherein said means for adjusting the location of the first point includes means for receiving signals from a keyboard indicating the adjustment of the location of said first point.

17. The apparatus of claim 15 wherein said means for adjusting the location of the first point includes means for receiving signals from a display user interface indicating the adjustment of the location of said first point.

18. The apparatus of claim 15 further comprising an output device for producing an image using said generated grayscale spline.

19. The apparatus of claim 18 wherein said output device includes a display.

20. The apparatus of claim 18 wherein said output device includes a printer.

21. The apparatus of claim 18 wherein said output device includes a plotter.

22. A computer program product executable by a processor for adjusting a grayscale spline, defined by a set of interconnected points, each of said points having a location adjustable by a user through a user interface, for an output device comprising:

a) program code means for adjusting, responsive to user input of a location adjustment through said user interface, a location of a first point previously located on said grayscale spline;

b) program code means for adjusting a location of at least one other point, previously located on said grayscale spline, based on the adjusted location of the first point;

c) program code means for generating a grayscale spline through said first point and said at least one other point; and d) program code means for producing an image with said output device using said generated grayscale spline.

23. The computer program product of claim 22 wherein said program code means for generating includes program code means for generating a continuous grayscale spline.

24. The computer program product of claim 23 wherein said program code means for generating includes program code means for generating a monotonic grayscale spline.

25. The computer program product of claim 24 wherein said program code means for generating includes program code means for generating a monotonic grayscale spline in a first derivative domain.

26. The computer program product of claim 22 wherein said program code means for adjusting said location at said at least one other point includes program code means for adjusting said location of said at least one other point based on a hierarchical relationship with said first point.

27. The computer program product of claim 26 wherein said program code means for adjusting the location of the first point includes program code means for receiving signals from a keyboard indicating the adjustment of the location of said first point.

28. The computer program product of claim 26 wherein said program code means for adjusting the location of the first point includes program code means for receiving signals from a display user interface indicating the adjustment of the location of said first point.

29. The computer program product of claim 26 wherein said program code means for producing an image includes program code means for producing an image with a display.

30. The computer program product of claim 26 wherein said program code means for producing an image includes program code means for producing an image with a printer.

31. The computer program product of claim 26 wherein said program code means for producing an image includes program code means for producing an image with a plotter.

32. A data processing system for adjusting a grayscale spline, defined by a set of interconnected points, each of said points having a location adjustable by a user through a user interface, for an output device comprising:

a) a processor for processing data;

b) a memory for storing data to be processed;

c) means for adjusting, responsive to user input of a location adjustment through said user interface, a location stored in memory of a first point previously located on said grayscale spline;

d) means for adjusting a location stored in memory of at least one other point, previously located on said grayscale spline, based on the adjusted location of the first point; and e) means for generating a grayscale spline through said first point and said at least one other point.

33. The data processing system of claim 32 wherein said means for generating includes means for generating a continuous grayscale spline.

34. The data processing system of claim 33 wherein said means for generating includes means for generating a monotonic grayscale spline.

35. The data processing system of claim 34 wherein said means for generating includes means for generating a monotonic grayscale spline in a first derivative domain.

36. The data processing system of claim 32 wherein said means for adjusting said location of said at least one other point includes means for adjusting said location of said at least one other point based on a hierarchical relationship with said first point.

37. The data processing system of claim 36 wherein said means for adjusting the location of the first point includes means for receiving signals from a keyboard indicating the adjustment of the location of said first point.

38. The data processing system of claim 36 wherein said means for adjusting the location of the first point includes means for receiving signals from a display user interface indicating the adjustment of the location of said first point.

39. The data processing system of claim 36 further comprising an output device for producing an image using said generated grayscale spline.

40. The data processing system of claim 39 wherein said output device includes a display.

41. The data processing system of claim 39 wherein said output device includes a printer.

42. The data processing system of claim 39 wherein said output device includes a plotter.

* * * * *